JEROME HAAS, OF STOCKTON, CALIFORNIA.

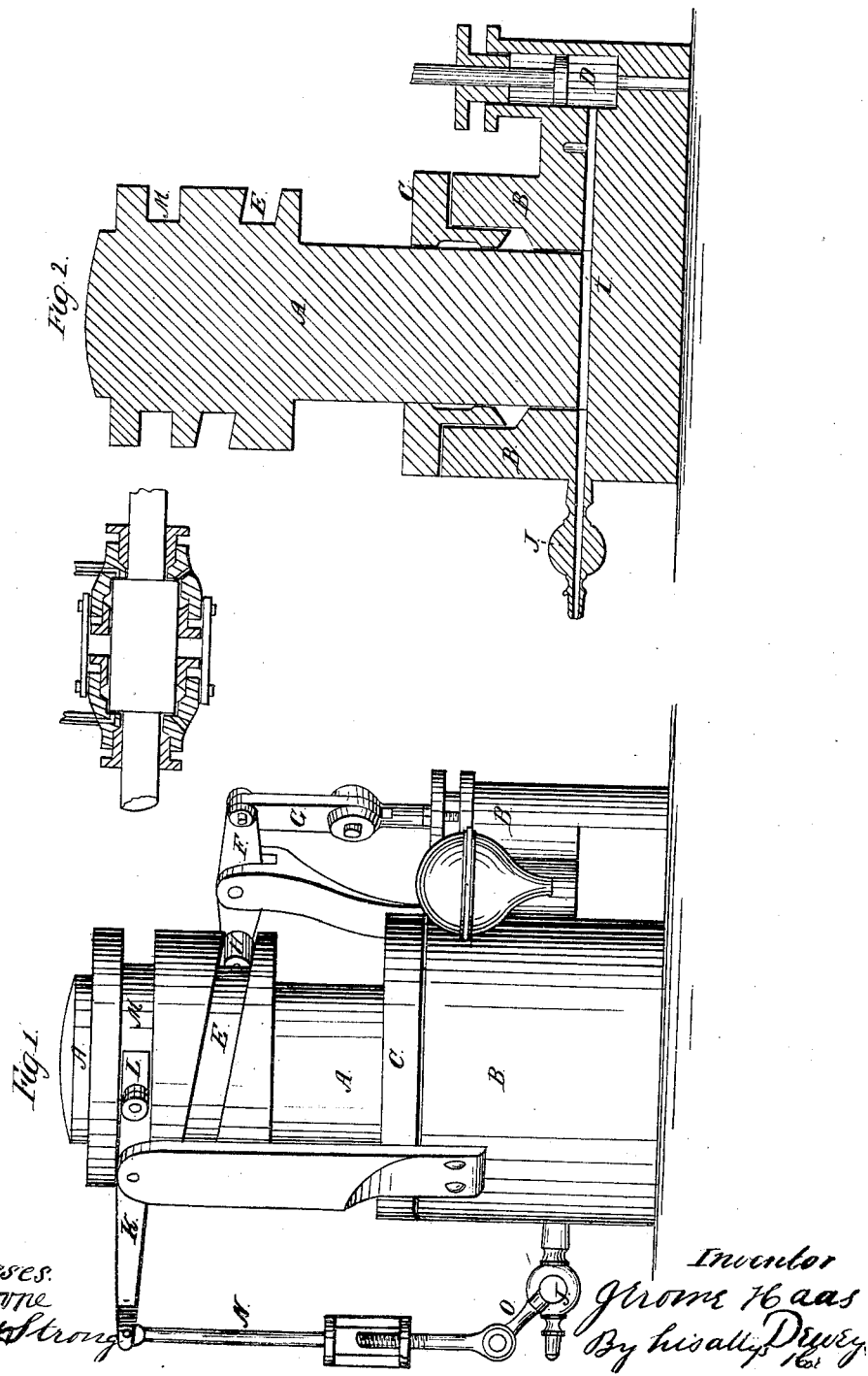

*Letters Patent No. 86,392, dated February 2, 1869.*

BEARING FOR SHAFTS.

The Schedule referred to in these Letters Patent and making part of the same.

*To all whom it may concern:*

Be it known that I, JEROME HAAS, of Stockton, county of San Joaquin, State of California, have invented an Improved Bearing for Shafts; and I do hereby declare the following description and accompanying drawings are sufficient to enable any person skilled in the art or science to which it most nearly appertains, to make and use my said invention or improvements without further invention or experiment.

My invention relates to an improved device, known as an anti-frictional step or bearing for shafts, it being applicable to propeller-shafts, and all such as have a horizontal thrust, but more especially as a step for vertical shafts; and It consists in the introduction of water beneath the end of the shaft by a pressure sufficient to slightly elevate it. This is accomplished by means of a small force-pump, operated by the revolution of the shaft, while, by means of a discharge-cock on the opposite side, also operated by the shaft, the elevation to which it rises is always regulated and controlled.

To more fully describe my invention, reference is had to the accompanying drawings, and letters marked thereon, of which—

Figure 1 is a side elavation of my device.
Figure 2 is a sectional elevation.

Similar letters of reference in each of the figures indicate like parts.

A is a portion of the shaft, and
B is the step in which it turns.

The lower part of the shaft is turned off, and a stuffing-box is formed by the gland C, which prevents leakage from the pressure of the water.

D is a small force-pump, which is operated as follows:

A groove, E, is made around the shaft in such a manner as to act as a cam. The lower short lever F is attached at one end to the piston-rod by the link G, and carries at its opposite end a friction-roller, H, which operates within the groove or slot E, so that as the shaft revolves it is moved up and down alternately, thus operating the pump, and forcing water, or other liquid, beneath the shaft at I, fig. 2.

In order to prevent the shaft from being lifted by the pressure to a greater height than is desirable, I attach a discharge-cock, J, to one side of the step, and having a passage connecting with the interior.

This cock is operated by means of the lever K, which has at one end a sliding block, L, or a friction-roller, which extends into a slot, M, which is turned around the shaft.

The opposite end of the lever is connected with the handle O of the cock by a rod, N, having a turn-buckle in the centre, by which its length may be changed and regulated at will.

When the shaft begins to revolve, it operates the pump, and forces water beneath the shaft, thus raising it from the bottom of the step.

As the shaft is raised to a sufficient height, it turns the cock, by means of the lever K, and allows the surplus water to escape, thus keeping the shaft at a constant height, while all friction on the step, and necessity for lubricating, are avoided.

In the case of horizontal shafts with a thrust, as in propellers, the same device may be used, as shown in red.

Having thus described my invention,
What I claim, and desire to secure by Letters Patent, is—

1. The combination of the cam-groove E, roller H, lever F, and pump D, for forcing a lubricator beneath the shaft, substantially as described.

2. In combination with the above-claimed device, the discharge-cock J, operated by the crank or arm O, adjustable rod N, lever K, and groove M, substantially as and for the purpose set forth.

In witness whereof, I have hereunto set my hand and seal.

JEROME HAAS. [L. S.]

Witnesses:
C. W. M. SMITH,
JNO. L. BOONE.